United States Patent [19]
Dixon et al.

[11] 3,862,083
[45] Jan. 21, 1975

[54] HIGH TEMPERATURE BRUSHING COMPOUND

[75] Inventors: George D. Dixon, Monroeville; Morris A. Mendelsohn; Charles R. Ruffing, both of Pittsburgh, all of Pa.

[73] Assignee: Westinghouse Electric Corporation, Pittsburgh, Pa.

[22] Filed: Nov. 29, 1972

[21] Appl. No.: 310,518

[52] U.S. Cl.............. 260/40 R, 260/861, 260/862
[51] Int. Cl............................................. C08g 51/04
[58] Field of Search........................... 260/861, 862

[56] References Cited
UNITED STATES PATENTS

| | | | |
|---|---|---|---|
| 2,528,235 | 10/1950 | Loritsch | 260/862 X |
| 2,610,959 | 9/1952 | Nordlander | 260/861 X |
| 2,795,009 | 6/1957 | Gosnell et al. | 260/861 X |
| 2,879,323 | 3/1959 | Nichols et al. | 260/861 X |
| 3,196,131 | 7/1965 | Mayer et al. | 260/861 X |
| 3,331,891 | 7/1967 | Thomas et al. | 260/862 |
| 3,441,535 | 4/1969 | Beacham et al. | 260/862 x |

*Primary Examiner*—Morris Liebman
*Assistant Examiner*—S. M. Person
*Attorney, Agent, or Firm*—R. D. Fuerle

[57] ABSTRACT

A high temperature polyester brushing compound is disclosed which comprises a polyunsaturated cyclic monomer or prepolymer, a free-radical generator, an inorganic thixotrope, and the reaction product of (1) an aromatic polycarboxylic acid, acid halide, ester to $C_6$, or anhydride, (2) a polyol, and (3) an unsaturated carboxylic acid, acid halide, ester to $C_6$, or anhydride. Optional ingredients include an inorganic filler and a free-radical inhibitor.

15 Claims, 1 Drawing Figure

PATENTED JAN 21 1975
3,862,083
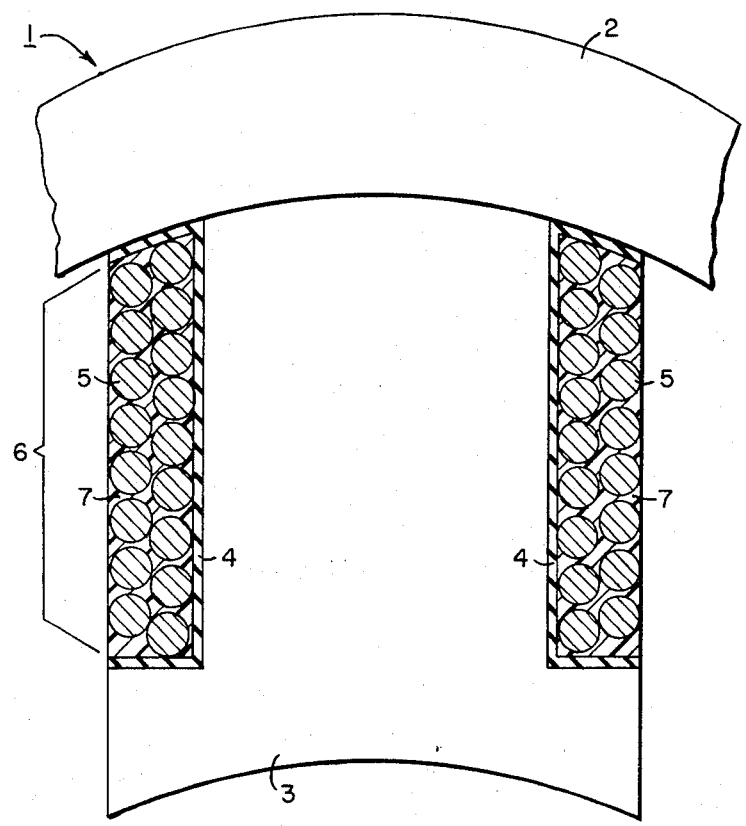

3,862,083

HIGH TEMPERATURE BRUSHING COMPOUND

CROSS REFERENCES TO RELATED CASES

This case is related to application Ser. No. 310,519, filed Nov. 29, 1972, by Morris A. Mendelsohn, titled "High Temperature Polyester Resin."

This case is also related to application Ser. No. 186,106, filed Oct. 4, 1970 by Morris A. Mendelsohn and Susan G. Hitchins titled "Thermosetting Resinous Adhesives and Tapes."

BACKGROUND OF THE INVENTION

After each layer of wire is wound in a motor or generator it is covered with a liquid brushing compound which is cured when the winding is completed. The brushing compound holds the wires in place so that they do not fly apart or rub together. Also, the brushing compound fills air pockets thereby increasing the overall thermal conductivity which makes the motor or generator run cooler.

Of the two common adhesive-type resins which can be used in brushing compounds, polyester resins and epoxy resins, neither is well-suited for continuous long-time service at 180°C, a requirement for use as a Class H material in motors and generators. Also, the epoxy brushing compounds now in use suffer from extensive run-off when heated to 150°C during cure and are only Class F materials (for use at 155°C).

SUMMARY OF THE INVENTION

Briefly, the brushing compound of this invention comprises a polyunsaturated cyclic monomer or prepolymer, a free radical generator, a thixotrope, and the reaction product of (1) an aromatic polycarboxylic acid or derivative (2) a polyol, and (3) an unsaturated carboxylic acid or derivative.

Our preferred polyester-based brushing compound is a Class H material and therefore can be used for long-time service at 180°C. This is somewhat surprising since polyesters are not normally high temperature resins. This brushing compound has a higher thermal stability than does the previously-used epoxy brushing compound, less run-off during cure, and better shear and tensile strengths at 180°C. It is easily applied to the coils at room temperature and does not contain solvents which would have to be removed during cure. The shelf line, cost, and electrical properties of the brushing compound are also good.

DESCRIPTION OF THE INVENTION

The accompanying drawing is a sectional view of a segment of a stator of a motor.

In the drawing a segment 1 of a stator consists of a frame 2 having multiple pole pieces 3 fixed thereto and covered with insulation 4. Wire 5 is wound over the pole pieces to form a coil 6. The interstices in the coil are filled with the cured brushing compound of this invention 7.

The brushing compound comprises about 30 to about 70% (all percentages herein are by weight) polyunsaturated cyclic monomer or prepolymer, about 1 to about 10 phr (parts per hundred parts resin, where "resin" means the reaction product plus the polyunsaturated cyclic monomer or prepolymer) inorganic thixotrope, up to about 20 phr inorganic filler, up to about 0.5% free-radical inhibitor, and about 30 to about 70% of the reaction product of (1) about 750 to about 1400 parts of an aromatic polycarboxylic acid, acid halide, ester to $C_6$, or mixtures thereof, (2) at least about 650 parts of a polyol having a ratio of carbon atoms to hydroxyl groups of about 1 to 1 to about 4 to 1 where the maximum amount of the polyol in the reaction product is about 1200 parts when the ratio is about 1 to 1 and is about 1800 parts when the ratio is greater than 1 to 1, and (3) about 440 to about 980 parts unsaturated carboxylic acid, acid halide, ester to $C_6$, anhydride, or mixtures thereof. Mixtures of two or more of any ingredient are also contemplated.

Examples of suitable polyunsaturated cyclic monomers include diallyl isophthalate, divinyl benzene, triallylcyanurate, and triallylisocyanurate. Diallyl isophthalate is preferred because it imparts a high heat distortion temperature to the system and it has been found to work very well. These monomers may be partially polymerized to form pre-polymers if the viscosity of the composition is too low.

The free radical generator preferably should have a half life of at least 10 minutes at 70°C so that the brushing compound can be stored at room temperature. Examples of suitable free radical generators include various peroxides such as 1,3-bis ($\alpha$-tert-butylperoxy isopropyl) benzene, methyl ethyl ketone peroxide, di-tert-butylperoxide, t-butyl perbenzoate, 2,5-dimethyl -2,5-di (t-butylperoxy) hexane, dicumyl peroxide, etc. and azo compounds such as azobisisobutyronitrile.

The amount of inorganic thixotrope is preferably about 2 to about 4 phr as this range generally produces a brushing compound which is thin enough to penetrate the wire well, yet thick enough to substantially reduce run-off. While the term "thixotrope" is difficult to define in terms of chemical structure, thixotropes are well-known in the art. Examples of suitable thixotropes include very finely divided silica, pulverized asbestos, polyacrylate salts, colloidal attapulgite and cellulose gums such as methyl cellulose, hydroxyethyl cellulose and hydroxy propyl methyl cellulose. Finely divided silica and pulverized asbestos are preferred because a small amount has a large thixotropic effect and they work well at high temperatures. Cellulosic thixotropes should be avoided because of poor thermal stability and inadequate retention of thixotropic properties at elevated temperatures.

The inorganic filler is a chemically inert finely divided material such as silica, alumina, calcium silicate, calcium carbonate, barium sulphate, clay, iron oxide, magnesium oxide, carbon black, talc (steatite), etc. Silica is preferred because it is inexpensive and works well.

The free-radical inhibitor scavanges extraneous free radicals to prevent the premature polymerization of the brushing compound. The amount of inhibitor should be less than the amount of free-radical generator so that the inhibitor does not interfere with the eventual initiation of the polymerization; preferably, the amount of inhibitor is at least about 10 times less than the amount of free-radical generator. Examples of inhibitors include substituted phenols and aromatic amines.

For the best properties at the least expense the aromatic polycarboxylic acid is preferably about 85 to about 100% isophthalic acid, its acid halides, its esters to $C_6$ (i.e., esters whose alcoholic residues contain up to 6 carbon atoms), or mixtures thereof, and to about 15% terephthalic acid, its acid halides, esters to $C_6$, or mixtures thereof. The acids themselves or their acid chlorides are preferred as they are less expensive. The esters may be alkyl or aryl. Examples include isophthalic acid chloride, methyl isophthalate, n-pentyl isophthalate, isophthalic terephthalic acid chloride, isopropyl terephthalate, etc. Examples of other suitable acids include phthalic acid, trimellitic acid, pyromellitic acid, etc.

The polyol has at least 2 carbon atoms and is preferably aliphatic with less than 6 carbon atoms for good flexibility. A 1 to 1 ratio of carbon atoms to hydroxyl groups is preferred as it has been found to work very well. If the ratio is greater than 2 to 1 the polyester has a lower heat distortion and tends to lose strength at high temperatures. The polyol may be cyclic, linear, or branched. Preferably the polyol has no more than one hydroxyl group on any carbon atom. Ethylene glycol and glycerol are preferred as they give better heat stability. Other examples of suitable polyols include 1,4-butanediol, 1,3-butanediol, trimethylol ethane, 1,2-propanediol, 1,3-propanediol, 1,2,3-butanetriol, 1,2,4-butanetriol, 1,5-pentanediol, 1,3-pentanediol, neopentyl glycol, 1,6-hexanediol, etc.

The unsaturated polycarboxylic acid is preferably about 600 to about 900 parts fumaric acid or about 500 to about 770 parts maleic anhydride or equivalent mixtures thereof because they are inexpensive, they co-react well with diallyl isophthalate, and are consistent with high heat distortion resins. Examples of other suitable unsaturated polycarboxylic acids include maleic acid, citraconic acid, itaconic acid, methyltetrahydrophthalic acid, dichloromaleic acid, chlorendic acid, tetrahydrophthalic acid, dodecenylsuccinic acid, succinic acid, mucic acid, dihydromuconic acid, and muconic acid.

The brushing compound is made by reacting together the aromatic polycarboxylic acid, the polyol, and the unsaturated carboxylic acid at about 200°C until the acid number is less than about 25. The reactants are cooled to about 100° to 125°C and the polyunsaturated cyclic monomer, a free-generator, inorganic thixotrope, and other ingredients are mixed in. The brushing compound is stored until needed, then brushed onto the coils and cured at about 150° to 200°C for about 1 to 4 or more hours, depending on the temperature.

EXAMPLES

The following examples further illustrate this invention.

A mixture of 184 parts glycerol and 744 parts ethylene glycol was charged into a reaction vessel. The mixture was heated, agitated, and sparged with nitrogen. A mixture, 1080 parts, of 95% isophthalic acid and 5% terephthalic acid was added at the fastest expedient rate, so that the reaction was complete in less than an hour, and before the temperature reached 150°C. The temperature was increased to 175° to 180°C and was maintained at that level until the acid number dropped to 100 to 115 whence the reactants were quickly cooled to 135° to 140°C. Then 754 parts of fumaric acid was added to the reaction vessel and the temperature was increased to 175°–180°C and held there for 2 hours. The temperature was raised to 185°–195°C and after two hours again increased to 200°–210°C and held there until the acid number reached 35–45. At this point 8 parts of a solution of 5% hydroquinone and 95% dibutyl phthalate was added. The reaction mass was held at 188°–192°C until the acid number dropped to 23–25 at which time 16 parts of the 5% hydroquinone-95% dibutyl phthalate solution was added. Heating was continued at 188°–192°C until the acid number dropped to 20–22 when the mass was cooled to room temperature. The brushing compound was then made by mixing 45 parts of the above-prepared resin with 55 parts diallyl isophthalate, 4 parts finely divided asbestos sold by Union Carbide under the trademark RG144 and 1 part 1,3-bis ($\alpha$-tert-butylperoxy isopropyl) benzene.

The above brushing compound and the presently-used epoxy brushing compound were each painted onto recently sandblasted faces of pairs of 1 ¼ inch aluminum cubes. Two faces of each pair were immediately brought together in a horizontal position and the cubes were baked for 2 hours at 150°C. Force was applied at various temperatures normal to the painted faces until the cubes separated in order to determine the tensile strengths of the brushing compounds. The following table gives the results.

| Temp. (°C) | Tensile Strength (lbs.) | |
|---|---|---|
| | Our Brushing Compound | Epoxy Brushing Compound |
| Ambient | 251, 242 | 990, 930 |
| 155 | 137, 163 | 2, 32 |
| 180 | 43, 50 | bond decomposed |

As the above and following tables indicate while the epoxy brushing compound was stronger at ambient temperatures, above 155°C the brushing compound of this invention was far superior.

Pairs of 6 inch by ½ inch aluminum strips were painted with our brushing compound and others with the epoxy compound. The strips were overlapped 1 inch and cured at 150°C for 2 hours. A force was applied in the direction of the strips to determine the shear strengths of the brushing compounds. The following table gives the results.

| Temp. (°C) | Shear Strength (lbs.) | |
|---|---|---|
| | Our Brushing Compound | Epoxy Brushing Compound |
| Ambient | 99, 90 | 159, 290 |
| 155 | 114, 124 | 34, 20 |
| 180 | 116, 126 | bond decomposed |

Two parallel pairs of 6 inch glass-served aluminum wires were overlapped 2 inches (the wires in one pair interlocking with the wires in the other pair) and wired together to form samples. The overlapped portions of samples were painted with the brushing compounds and were heated 2 hours at 150°C. The wires were pulled with the force parallel to the wires until the bond failed. The following table gives the resulting shear strength.

| Temp. (°C) | Shear Strength (lbs.) | |
|---|---|---|
| | Our Brushing Compound | Epoxy Brushing Compound |
| Ambient | 511, 517 | 400, 514 |
| 155 | 56, 34 | 35, 28 |
| 180 | 107, 123 | 9, 13 |

The higher values for our brushing compound at 180°C than at 155°C for the previous two tests are believed to be due to further curing during the tests.

Three 6 inch glass-served aluminum wires were laid parallel, painted with a brushing compound, cured at 150°C for 2 hours, and cut into 1 inch lengths. Force was applied perpendicular to the direction of the wires to determine the tensile strengths of the brushing compounds. The following table gives the results.

| Temp. (°C) | Tensile Strength (lbs.) Our Brushing Compound | Epoxy Brushing Compound |
| --- | --- | --- |
| Ambient | 11, 13 | 32, 40 |
| 155 | 8, 7 | 1, 1 |
| 180 | 10, 16 | <<1 |

Aluminum strips 1 inch by 6 inches were each painted with 1 gm of brushing compound to give a coating similar to that used in practice. The strips were hung vertically in an oven at 150°C for 2 hours, then removed and weighed. There were 0.45 gms of our brushing compound remaining (55% loss) and 0.05 gms of the epoxy brushing compound remaining (95% loss).

We claim:

1. A high temperature brushing compound comprising:
   1. about 30 to about 70% of a reaction product having an acid number of up to about 25 which comprises:
      A. about 750 to about 1400 parts of a compound about 85 to about 100% selected from the group consisting of isophtholic acid, its acid halides, its esters to $C_6$, and mixtures thereof, and up to about 15% selected from the group consisting of terephthalic acid, its acid halides, its esters to $C_6$, and mixtures thereof;
      B. about 650 to about parts of a polyol selected from the group consisting of ethylene glycol, glycerol, and mixtures thereof; and
      C. about 440 to about 980 parts of a compound selected from the group consisting of unsaturated carboxylic acids, their acid halides, their esters to $C_6$, their anhydrides, and mixtures thereof;
   2. about 30 to about 70% of a compound selected from the group consisting of diallyl isophthalate, its prepolymers, and mixtures thereof;
   3. about 0.1 to about 3 phr free-radical generator;
   4. about 1 to about 10 phr inorganic thixotrope;
   5. up to about 20 phr inorganic filler; and
   6. up to about 0.5% of a free-radical inhibitor.

2. A brushing compound according to claim 1 wherein the amount of said inorganic thixotrope is about 2 to about 4 phr.

3. A brushing compound according to claim 1 wherein said free-radical generator has a half life of at least 10 minutes at 70°C.

4. A brushing compound according to claim 1 wherein the amount of said free-radical inhibitor is at least 10 times less than the amount of said free-radical generator.

5. A brushing compound according to claim 1 wherein said reaction product and said polyunsaturated cyclic monomer are each about 40 to about 60% of said brushing compound.

6. A brushing compound according to claim 1 wherein (1) (C) is a compound selected from the group consisting of about 600 to about 900 parts fumaric acid, about 500 to about 770 parts maleic anhydride, and equivalent mixtures thereof.

7. A brushing compound according to claim 1 wherein components (1), (2), and (3) form a polymeric structure.

8. A brushing compound according to claim 1 wherein said inorganic filter is silica.

9. A brushing compound according to claim 1 wherein said thixotrope is selected from the group consisting of finely divided silica, pulverized asbestos, and mixtures thereof.

10. A brushing compound according to claim 1 wherein (1) (A) is about 85 to about 100% selected from the group consisting of isophthalic acid, its acid chloride, and mixtures thereof, and up to about 15% selected from the group consisting of terephthalic acid, its acid chloride, and mixtures thereof.

11. A method of bonding together wires in a coil comprising applying a brushing compound according to claim 1 to said wires and curing said brushing compound at about 150 to about 200°C for about 1 to about 4 hours.

12. A method according to claim 11 wherein said high temperature brushing compound comprises:
   1. about 10 to about 60% of a reaction product having an acid number of up to about 25 which comprises:
      A. about 750 to about 1400 parts of a compound which is about 85 to about 100% selected from the group consisting of isophthalic acid, its acid chloride, and mixtures thereof, and up to about 15% selected from the group consisting of terephthalic acid, its acid chloride, and mixtures thereof;
      B. about 740 to about 1120 parts of a compound selected from the group consisting of ethylene glycol, glycerol, and mixtures thereof; and
      C. about 440 to about 980 parts of a compound selected from the group consisting of about 600 to about 900 parts fumaric acid, about 500 to about 700 parts maleic anhydride, and equivalent mixtures thereof;
   2. about 40 to about 60% of a compound selected from the group consisting of diallyl isophthalate, its prepolymers, and mixtures thereof;
   3. about 0.1 to about 3 phr free-radical generator having a half life of at least 10 minutes at 70°C;
   4. about 2 to about 4 phr inorganic thixotrope selected from the group consisting of finely divided silica, pulverized asbestos, and mixtures thereof;
   5. up to about 20 phr silica filler; and
   6. up to about 0.5% free-radical inhibitor, the amount of said inhibitor being at least 10 times less than the amount of said free-radical generator.

13. An electrical apparatus comprising a coil of wire embedded in a cured high temperature brushing compound which comprises:
1. about 40 to about 60% of a reaction product having an acid number of up to about 25 which comprises:
   A. about 750 to about 1400 parts of a compound which is about 85 to about 100% selected from the group consisting of isophthalic acid, its acid chloride, and mixtures thereof, and up to about 15% selected from the group consisting of terephthalic acid, its acid chloride, and mixtures thereof;
   B. about 740 to about 1120 parts of a compound selected from the group consisting of ethylene glycol, glycerol, and mixtures thereof; and
   C. about 440 to about 980 parts of a compound selected from the group consisting of about 600 to about 900 parts fumaric acid, about 500 to about 700 parts maleic anhydride, and equivalent mixtures thereof;
2. about 40 to about 60% of a compound selected from the group consisting of diallyl isopthalate, its prepolymers, and mixtures thereof;
3. about 0.1 to about 3 phr free-radical generator having a half life of at least 10 minutes at 70°C;
4. about 2 to about 4 phr inorganic thixotrope selected from the group consisting of finely divided silica, pulverized asbestos, and mixtures thereof;
5. up to about 20 phr silica filler; and
6. up to about 0.5% free-radical inhibitor, the amount of said inhibitor being at least 10 times less than the amount of said free-radical generator.

14. An electrical apparatus comprising
a coil of wire embedded in a cured high temperature brushing compound which comprises:
   A. about 750 to about 1400 parts of a compound about 85 to about 100% selected from the group consisting of isophthalic acid, its acid halides, its esters to $C_6$, and mixtures thereof, and up to about 15% selected from the group consisting of terephthalic acid, acid halides, esters to $C_6$, and mixtures thereof;
   B. about 650 to about 1200 parts of a polyol selected from the group consisting of ethylene glycol, glycerol, and mixtures thereof; and
   C. about 440 to about 980 parts of a compound selected from the group consisting of unsaturated carboxylic acids, their acid halides, their esters to $C_6$, their anhydrides, and mixtures thereof;
2. about 30 to about 70% of a compound selected from the group consisting of diallyl isophthalate, its prepolymers, and mixtures thereof;
3. about 0.1 to about 3 phr free-radical generator;
4. about 1 to about 10 phr inorganic thixotrope;
5. up to about 20 phr inorganic filler; and
6. up to about 0.5% of a free-radical inhibitor.

15. An apparatus according to claim 14 wherein said coil is part of a DC motor.

* * * * *